Feb. 10, 1959

J. LAMBERTON ET AL 2,873,237

METHOD OF SEPARATING ISOTOPES

Filed Nov. 21, 1956

INVENTORS.
Jean Lamberton
Henri De Lacheisserie
BY

THEIR ATTORNEYS

United States Patent Office 2,873,237
Patented Feb. 10, 1959

2,873,237

METHOD OF SEPARATING ISOTOPES

Jean Lamberton, Paris, and Henri de Lacheisserie, Versailles, France, assignors to Societe d'Electro-Chimie d'Electro-Metallurgie et des Acieries d'Ugine, Paris, France, a corporation of France Application November 21, 1956, Serial No. 623,692

Claims priority, application France November 24, 1955

3 Claims. (Cl. 204—125)

This invention relates to the separation of isotopes.

Various electrolytic methods have been proposed to accomplish the separation of isotopes. All of these methods utilize a direct current of constant intensity and all of them require diverse processes to remove the obtained products from the electrolysis area. In the case of metals such as lithium, which amalgamate with mercury, a constantly renewed mercury cathode has been used.

Figure 1:
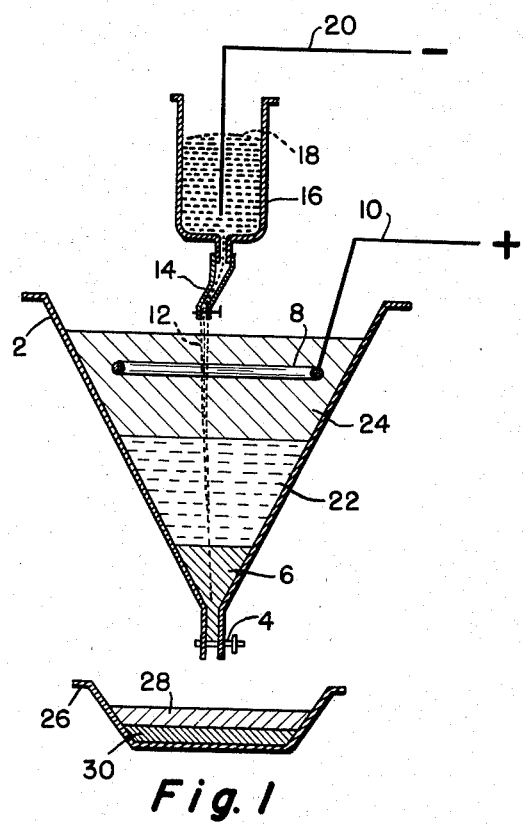
Figure 2:
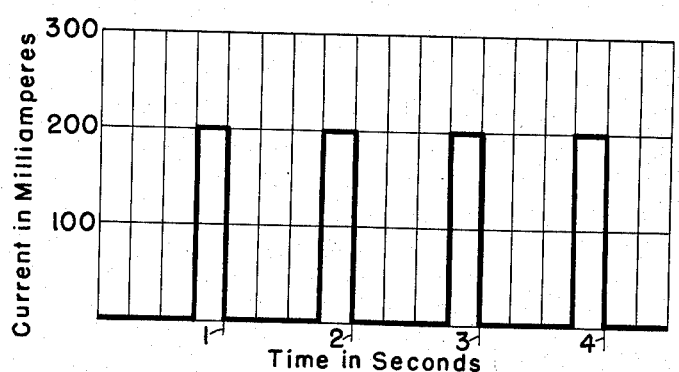

In the accompanying drawings which illustrate a preferred embodiment of the invention, Figure 1 is a diagrammatic elevation of an apparatus suitable for carrying out the method; and Figure 2 is a current-time curve.

In accordance with the present invention, a liquid electrolyte (melted salt or solution) containing the isotopes to be separated is subjected to an electric current which varies in intensity periodically. This is accomplished by periodically applying a voltage to two electrodes immersed in the electrolyte, thereby causing an electric current to flow from the anode to a cathode immersed in the electrolyte. The flow of electric current causes a sudden variation of the concentration of ions of the isotopes near the electrodes, which variation in concentration of ions causes the portion of the electrolyte adjacent the electrodes to become richer in one of the isotopes than the other. A part of or all of the ions thus concentrated in the portion of the electrolyte adjacent the electrodes are rapidly withdrawn from the main body of electrolyte either by discharge of said ions on the electrodes or by any other means. The electric current is then suppressed or, if desired, is caused to flow in a reverse direction until the portion of the electrolyte adjacent the cathode attains almost the same composition as that of the main body of the electrolyte. This periodic substantial increasing and decreasing of the electric current and the continuous removal of the ions in the portion of the electrolyte adjacent the cathode are continued as long as required to produce the desired separation of isotopes.

As an electrolyte, it is possible to use a compound of the element containing the isotopes to be separated, the compound being either melted or in the form of an aqueous or organic solution.

Practically, the carrying out of the process consists in applying a periodic voltage to the electrodes of an electrolytic cell. Although a merely modulated voltage might be used, it is preferred to cut off the voltage periodically. In particular, the frequency of modulating or cutting off the voltage is chosen according to the relative speeds of migration, in the electrolyte employed, of the ions of the isotopes to be separated and according to the proportions of isotopes in the starting compound. The optimum frequency has to be experimentally determined for each particular case.

As previously stated, for each sudden application of voltage there is a variation in the concentration of ions in the portion of the electrolyte adjacent the electrodes. Owing to the difference between the speeds of migration of the ions of the different isotopes, the relative proportions of said ions are modified in that portion of the electrolyte adjacent the electrodes, there being an enrichment of one of the ions in this portion. The accumulation on the electrode surface must be immediately followed by the total or partial removal of the ions from this enriched area. Such removal may be accomplished by discharge of ions on the electrodes, for instance, by metal deposit in the case of metallic ions or by a gas discharge in the case of ions of gaseous elements.

To make the discharge of ions possible, it is necessary that the applied voltage be equal to or higher than the deposit voltage of the considered ion and that the voltage be maintained at this value for a time long enough to allow the formation of the deposit under the action of the current resulting from the applied voltage. However, this time must be short enough to prevent a noticeable reduction of the ion-enriching rate near the electrodes by the diffusion of ions from the main body of electrolyte into that portion of the electrolyte adjacent the electrodes.

The removal of ions from the enriched area adjacent the electrodes may be accomplished by other methods, for instance, by making the enriched area enter the body of the electrodes, said electrodes being formed of a porous material and, if desired, being provided with a suction device. In any event, as soon as at least a part of the ions of the enriched area has been removed from the electrolyte, the flow of current must be suppressed or decreased or, if desired, reversed so as to bring back the composition of the portion of the electrolyte adjacent the cathode to near that of the main body of the electrolyte. It is advisable to stir the electrolyte to cause the whole bath to return to a homogeneous composition at each oscillation of the electric current.

Of course, in most cases, the operation thus carried out will not cause a total separation of the isotopes but only an enrichment of one of the isotopes relative to another isotope, which enrichment will be greater, the greater is the difference in speeds of migration of the different ions at each oscillation of the current.

Naturally, it will be possible to carry out the process by repeating the operations on successively enriched baths resulting each time from treatment of a previous bath, according to the well-known process of cascades.

Referring more particularly to the accompanying drawings, the present method will be described in connection with the separation of lithium isotopes from an electrolyte containing lithia.

The electrolyzer tank 2 was cone-shaped and was provided adjacent its bottom with a plug or tap 4 for periodically or continuously removing a body 6 of lithium-mercury amalgam from the tank. An iron wire spring 8 concentrically arranged in the upper part of the tank constituted the anode and was connected by a wire 10 to the positive terminal of a source of electric current (not shown). The cathode was constituted by a thin stream 12 of mercury fed by a capillary tube 14 connected to a container 16 containing a quantity 18 of mercury. The wire spring 8 was spaced 80 mm. from the stream 12 of mercury. A wire 20 connected the body of mercury with the negative terminal of the source of electric current. The tank 2 contained a bed 22 of an insulating liquid which was non-reactive with the lithium-mercury amalgam, such bed being, for example, carbon tetrachloride. A bed 24 constituted of a saturated (at 20° C.) aqueous solution of lithia was contained in the tank 2 above the insulating bed 22, the anode 8 being located within the bed 24. The depth of the lithia bed 24 was 80 mm. A container 26 containing a dilute solution of sulphuric acid was located below the electrolyzer tank 2 in a position to receive a quantity of lithium-mercury amalgam 6 and to decompose it and form lithium sulphate. In feeding the stream of mercury 12 to the electrolyzer tank 2, the lower end of the capillary tube 14 was continuously displaced around the axis of the tank.

The device was used in the following manner.

Mercury was allowed to flow from the container 16 through the capillary tube 14 so as to form a thin stream 12 of mercury which, at first, was continuous and thereafter was discontinuous after its passage through the area near the plane where the anode 8 was located. The anode and cathode were connected to a current source. The current flowing through the electrolyte decomposed the lithia, ionized the lithium so produced and the lithium amalgamated with the stream 12 of mercury. The body 6 of lithium-mercury amalgam was periodically or continuously removed from the tank 2 by opening the tap 4. The amalgam removed from the tank 2 fell into the container 26 where it was decomposed by contact with the dilute sulphuric acid solution to form a layer 28 of lithium sulphate and a layer 30 of mercury.

The following Examples I and II illustrate the method according to the present invention.

*Example I*

A current of 200 milliamperes intensity was caused to flow through the electrolyte for a period of 0.125 second and then the current was cut off for a period of 0.375 second. This periodic oscillation of current was carried out for 8 hours. The current efficiency was 58%.

*Example II*

A current of 200 milliamperes intensity was caused to flow through the electrolyte for a period of 0.25 second and then the current was cut off for a period of 0.75 second. This periodic oscillation of current was carried out for 8 hours. The current efficiency was 70%. The oscillation period used according to this example is illustrated in Figure 2.

Analyses were made by the use of a mass spectrometer to determine the isotopes ratio $$\frac{Li\ 7}{Li\ 6}$$

in the lithium sulphates produced according to Examples I, and II. The ratio $$\frac{Li\ 7}{Li\ 6}$$

in the various materials was as follows:

Starting material _____ 12.0
Example I _____ 11.3
Example II _____ 11.4

From the above results, it can be seen that according to Examples I and II, in which the current intensity varied periodically, the ratio $$\frac{Li\ 7}{Li\ 6}$$

in the obtained products differed substantially from that in starting material.

The invention is not limited to the preferred embodiment but may be otherwise embodied or practiced within the scope of the following claims.

We claim:

1. The method of increasing the content of one isotope to another isotope in an electrolyte containing said isotopes, which comprises passing an electric current from an anode to a cathode through said electrolyte, periodically substantially increasing and decreasing said electric current, thereby, at each increase in current, increasing the concentration of ions of one isotope relative to the concentration of ions of another isotope in the portion of the electrolyte adjacent the electrodes, and removing from the main body of electrolyte the ions of said isotopes in the portion of the electrolyte adjacent the electrodes.

2. The method of increasing the content of one isotope which amalgamates with mercury relative to another isotope which amalgamates with mercury in an electrolyte containing said isotopes, said isotopes being of a character which deposit on a mercury cathode under the influence of an electric current, which comprises flowing a stream of mercury through said electrolyte, passing an electric current from an anode through said electrolyte to said stream of mercury as a cathode, said stream of mercury being continuous at said anode periodically substantially increasing and decreasing said electric current, thereby, at each increase in current, amalgamating said isotopes with said mercury but in proportions different from those in said electrolyte, and removing said amalgam from said electrolyte.

3. The method of increasing the content of one lithium isotope relative to another lithium isotope in lithia, which comprises flowing a stream of mercury through a solution of lithia containing said isotopes, passing an electric current from an anode through said solution to said stream of mercury as a cathode, said stream of mercury being continuous at said anode periodically substantially increasing and decreasing said electric current, thereby, at each increase in current, amalgamating said isotopes with said mercury but in proportions different from those in said solution, and removing said amalgam from said solution.

References Cited in the file of this patent

UNITED STATES PATENTS

| | | |
|---|---|---|
| 588,276 | Kellner | Aug. 17, 1897 |
| 1,566,265 | Antisell | Dec. 22, 1925 |
| 2,645,610 | Madorsky | July 14, 1953 |
| 2,745,803 | Leveque | May 15, 1956 |

FOREIGN PATENTS

| | | |
|---|---|---|
| 622,724 | Great Britain | May 6, 1949 |
| 1,125,172 | France | July 9, 1956 |

OTHER REFERENCES

Analyst, vol. 73, 1948, pages 384–387 (article by Loofbourow et al.)